United States Patent [19]

Landolt

[11] Patent Number: 5,568,413
[45] Date of Patent: Oct. 22, 1996

[54] ANALOG CIRCUIT IMPLEMENTING FUZZY RULES WITH POLYNOMIAL OUTPUT COEFFICIENTS

[75] Inventor: Oliver Landolt, Neuchâtel, Switzerland

[73] Assignee: CSEM-Centre Suisse d'Electronique et de Microtechnique SA Recherche et Developpement, Neuchatel, Switzerland

[21] Appl. No.: 352,082

[22] Filed: Nov. 30, 1994

[30] Foreign Application Priority Data

Dec. 2, 1993 [FR] France ................................. 93 14455

[51] Int. Cl.$^6$ .................................................... G06G 7/00
[52] U.S. Cl. ............................................. 364/807; 395/3
[58] Field of Search ............................ 364/807; 395/3, 395/900

[56] References Cited

U.S. PATENT DOCUMENTS

| | | | |
|---|---|---|---|
| 5,126,600 | 6/1992 | Zhang | 395/3 |
| 5,167,005 | 11/1992 | Yamakawa | 364/807 |
| 5,367,610 | 11/1994 | Ohtsubo et al. | 395/3 |
| 5,371,832 | 12/1994 | Eichfeld et al. | 395/3 |
| 5,392,383 | 2/1995 | Tornber | 395/3 |

OTHER PUBLICATIONS

IEEE Transactions On Systems, Man, And Cybernetics, vol. SMC-15, No. 1, Jan. 1985, New York, USA, pp. 116-132, T. Takagai et al "Fuzzy Identification of Systems and Its Applns. to Modeling and Control".

Fuzzy Sets And Systems, vol. 58, No. 3, Sep. 24, 19983, Amsterdam, NL., pp. 329-337 XP000396611 Cing-Chang Wong "Realization of linear outputs by using mixed fuzzy logics".

*Primary Examiner*—Tan V. Mai
*Attorney, Agent, or Firm*—Sughrue, Mion, Zinn, Macpeak & Seas

[57] ABSTRACT

This fuzzy logic controller of the analog type enables the implementing of a set of fuzzy rules for which the output values are polynomial functions of the input variables. The controller functions by determining initially the weights of the different rules, then estimating a global value for each of the coefficients of the polynomials delivering the output values under the different rules. Finally the controller deliveres a global output value determined by evaluating the value of a polynomial for which the coefficients are the global values evaluated beforehand.

3 Claims, 2 Drawing Sheets

ANALOG CIRCUIT IMPLEMENTING FUZZY RULES WITH POLYNOMIAL OUTPUT COEFFICIENTS

BACKGROUND OF THE INVENTION

The present invention relates to a fuzzy logic controller of the analog type which implements a set of fuzzy rules with which are respectively associated output values which can be expressed as as many polynomials of a same set of input variables, the coefficients of said polynomials having predetermined values (possibly equal to zero) specific to the different rules and each of said rules including at least one condition consisting of a fuzzy relationship between one of said input variables and a reference value.

Known fuzzy logic controllers are provided in order to implement fuzzy rules for which the output values are predetermined constants. Such fuzzy rules define an association between a fuzzy subset of an input space and a point in an output space. Typically, such a known fuzzy rule will take the following form:

IF $x_1 \approx p_1$ AND $x_2 \approx p_2$ THEN $y = u$ where $p_1$ and $p_2$ are reference values which define the center of a fuzzy domain or subset and in which u is a predetermined constant quantity (scalar or possibly vectorial) which defines a point in an output space of any dimension.

Since a fuzzy rule defines, as we have just mentioned, an association between a domain of an input space and a point of an output space, a set of such rules enables defining region by region a relationship between variables in the input space and variables in the output space.

When the domains of the input space associated with the different rules are disjunctive the relationship defined by the set of rules causes each domain to correspond simply with the corresponding points of the output space. On the other hand, when the domains of the input space associated with the different rules overlap one another, it is necessary to provide an algorithm in order to permit determination in unequivocal fashion of an unique global output magnitude for the set of rules in the overlapping zones of the domains.

The algorithm most frequently used in order to determine a global output value for a set of rules is the calculation of the center of gravity. Such center of gravity calculation comes down to the calculation of a weighted average of the output magnitudes of the different rules, the weighting factor being the weight (or degree of pertinence) of each of such rules. Let us point out nevertheless that other algorithms have been proposed in order to fulfil the same function and that all such algorithms are generally known as "defuzzification" algorithms.

The output magnitudes of the fuzzy rules of the type of those described hereinabove being constant, the slope of the relationship binding the input and output magnitudes is not explicitly defined by the rules themselves, but follows from the algorithm for combining the conclusions of the rules in the overlapping zones.

In certain applications of fuzzy logic, the exact manner according to which the global output value of the set of rules varies, can be important in certain regions. A slightly more general formulation of the idea of fuzzy rules has thus been proposed, in particular by T. Terano, K. Asai and M. Sugeno in the work "Fuzzy Systems Theory And Its Application", Academic Press 1992. According to this new formulation, the output values of fuzzy rules are no longer forcibly constant magnitudes, but can also be functions of the input values. Such a rule is expressed then for example by:

IF $x_1 \approx p_1$ AND $x_2 \approx p_2$ THEN $y = g(x_1, x_2)$

The present invention more specifically concerns fuzzy rules the output values of which can be expressed as polynomial functions.

In order to evaluate a global output value of a set of fuzzy rules for which the respective output values can be expressed as polynomial functions of the input variables, the standard procedure will be applied as follows:

initially, for each of the rules, the associated polynomial function is evaluated, as well as the weight or degree of pertinence of said rule;

next, starting with the different output values and taking into account the weight of each rule, there will be calculated the global output value of the set of rules in applying a "defuzzification" algorithm.

As can be appreciated, the manner of proceeding set forth hereinabove requires estimating the value of a different polynomial for each rule. In the case of implementing the procedure with the help of an analog device, an electronic circuit intended to evaluate a polynomial must be provided for each rule of the set of rules. The implementing of the process which has just been described with the help of analog circuits thus exhibits the drawback of being expensive in hardware.

SUMMARY OF THE INVENTION

A purpose of the present invention is thus to deliver a fuzzy logic controller of the analog type operating according to a process, the putting into operation of which is less costly in hardware.

To this effect, the present invention has as its subject a fuzzy logic controller of the analog type enabling the putting into operation of a set of fuzzy rules with which are respectively associated output values expressed as as many polynomials, the coefficients of said polynomials having predetermined values specific to the different rules, and each of said rules including at least one condition consisting of a more or less true relationship between one of said input variables and a reference value, said controller comprising:

first means for determining the weight of each of the fuzzy rules, said weight being determined by combining results of comparison of the values of the input variables with the reference values in the different conditions of said rule, said controller being characterized in that it further comprises:

second means for evaluating, for each of said coefficients, a global value of said coefficient, said global value being determined starting from the different values of said coefficient in the different rules, taking into account said respective weights of said rules, and third means for delivering, as output of said controller, the value of a polynomial in said set of input variables, the coefficients of said polynomial being said global values delivered by said second means.

Thanks to the characteristics of the present invention set out hereinabove, the estimation of a global output value for a set of fuzzy rules requires only a single circuit for estimating the value assumed by a polynomial and this whatever be the number of rules implement.

An advantage of the present invention is that the polynominal evaluation circuit comes into play only at the end of the procedure implement by the analog controller. Thanks to this characteristic, it is relatively easy to conceive an integrated circuit which can be configured optionally either as an analog controller for a set of known fuzzy rules with multiple outputs or as an analog controller for a set of fuzzy rules with an output value which is a polynomial function of the input variables.

According to a preferred embodiment of the present invention, the polynomial functions of the input variables are first-order polynomial function functions.

$$g(x_1, x_2) = a_o + a_1 x_1 + a_2 x_2$$

In this latter case, each fuzzy rule defines, on the one hand, the output value y associated with a particular state of the inputs $(x_1, x_2) \approx (p_1, p_2)$ and, on the other hand, the gradient of the function $y(x_1, x_2)$ in the neighborhood of $(p_1, p_2)$.

The most frequent applications of fuzzy logic concern control. There are numerous cases in control in which the gradient of the control function is important in certain regions. The fact of being able to specify explicitly the gradient of the control function in the conclusion of a single rule enables replacing several rules with constant output. This represents potentially an economy of hardware for the implementing of a function by fuzzy rules. Additionally, this latter variant of the present invention is simple to obtain in the form of an analog electronic circuit since it necessitates only a single evaluation circuit for a polynomial and that, such polynomial being of degree 1, the evaluation circuit requires only a single multiplier per input variable whatever be the number of rules to be implement.

Other characteristics and advantages of the present invention will appear in the course of the description to follow given solely by way of example and referring to the annexed drawings.

DESCRIPTION OF A PREFERRED EMBODIMENT

Figure 1:
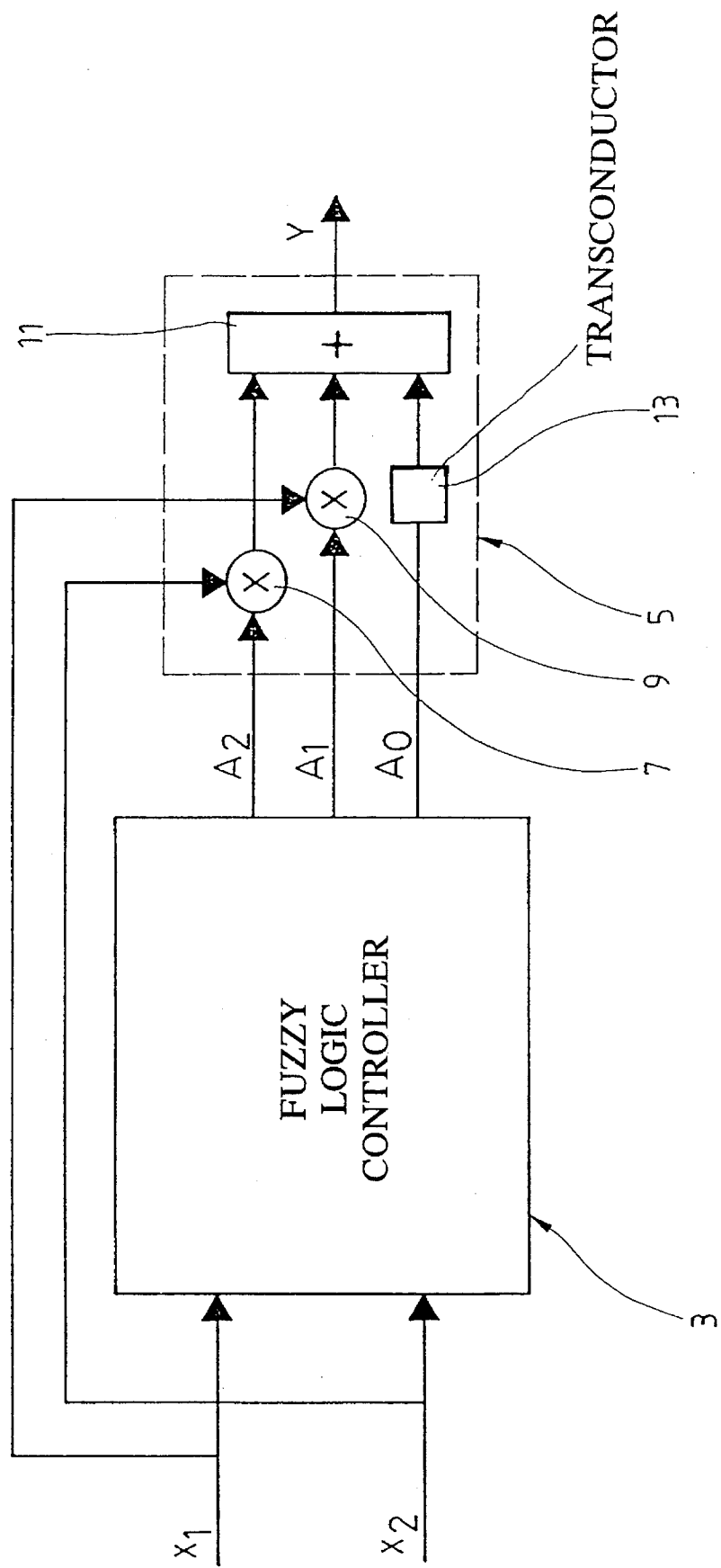
FIG. 1 is a schematic showing the principle of an embodiment of an analog controller using fuzzy logic according to the present invention.

FIG. 1 is the schematic of the principle of a fuzzy logic analog controller according to the preferred embodiment of the present invention. This controller is provided for implementing a set of rules for which the output values are first-order polynomial functions of the input variables. There can be any number of such rules. In the present example, the fuzzy rules implement are rules having two inputs, and the corresponding input values are designated respectively by $x_1$ and $x_2$ on the drawing. The output value of each of such fuzzy rules implement here is expressed thus as an first order polynomial function combination having the form:

$$y = a_o + a_1 x_1 + a_2 x_2$$

Referring now to the schematic of principle of FIG. 1, it is seen that the analog controller according to the present invention is functionally subdivided into two blocks. There is seen, on the one hand, a first block which, on the drawing, amounts only to a rectangular box referenced 3 and, on the other hand, a second block for which a certain number of constituents are shown and which is bounded by a frame in broken outline referenced 5.

The first block, or module 3 includes, on the one hand, first means intended to evaluate the weight (or degree of pertinence) of each of the fuzzy rules to be implement and, on the other hand, second means intended to determine for each of the polynomial coefficients $a_o$, $a_1$ or $a_2$ a global value $A_o$, $A_1$ or $A_2$ of said coefficient.

As to the block or module 5, this includes means to evaluate an first-order polynomial function of the input variables $x_1$, $x_2$ in taking as coefficients the global values $A_o$, $A_1$ and $A_2$ delivered by module 3.

I am now going to describe in greater detail the operation of module 3. In the present example, module 3 is, as I have already said, made up in the form of an analog integrated circuit. Such module is arranged in order to receive on its inputs two electrical currents the intensities of which correspond respectively to the values assumed by the two input variables $x_1$ and $x_2$.

The first means (not shown) intended to evaluate the weight of each of the rules to be implement are formed, in this example, by a plurality of analog circuit elements, each conceived in order to evaluate, starting from the intensities of the two currents received as input on module 3, the weight of one of the rules and, in order to deliver a current representative of such weight. Such circuit elements can, for example, take the form of the circuit element described in the pending patent application FR 93 06097 (corresponding to published European Application No. EP-A-0 617 359).

The second means (not shown) intended to determine a global value for each coefficient are formed, in this example, by three distinct analog circuit elements, each provided in order to determine the center of gravity of one of the three coefficients $a_o$, $a_1$ or $a_2$.

Each of the circuit elements for the evaluation of a center of gravity is subdivided into as many sub elements as there are rules to be implement, each of such subelements including, on the one hand, an input connected to the first means in a manner to receive the current representative of the weight of one of the rules and, on the other hand, a source of pre-determined voltage, the level of which is representative of the value of the coefficient in this same rule.

The different subelements forming the analog circuit element are connected to one another and this circuit element deliveres as output a voltage which is the center of gravity of the voltages representative of the coefficient values in the different rules. An analog circuit element for evaluating the center of gravity, is described for example in the pending application already cited hereinabove.

The operation of module 3, as described, is identical to that which would be exhibited by a fuzzy logic controller provided for estimating the center of gravity of output values of a set of known fuzzy rules, each having as conclusion a fixed point $(a_{oi}, a_{1i}, a_{2i})$ in an output space of three dimensions. Thanks to this equivalence, a known fuzzy logic controller can be used, according to the present invention, at the output of which it will simply be necessary to add an first-order polynomial function combination module corresponding to block 5 of the schematic of FIG. 1.

We are now going to describe in greater detail the first-order polynomial function combination module corresponding to block 5 of FIG. 1. The function of module 5 is to deliver at its output a current the intensity of which is representative of the first-order polynomial function of the input variables $x_1$ and $x_2$, the coefficients of such first-order polynomial function being the three global values $A_o$, $A_1$ and $A_2$ delivered by module 3. In conformity with the preceding, module 5 receives on its input, on the one hand, the voltages representative of the three coefficients $A_o$, $A_1$ and $A_2$ delivered by block 3 and, on the other hand, the voltages the values of which are representative of the two input variables $x_1$ and $x_2$.

As we have already said, FIG. 1 is a schematic of the principle and is thus not the plan of a finished electronic circuit. In these conditions, it will be understood that the connection shown between the inputs of $x_1$ and $x_2$ in block 3 and the inputs of $x_1$ and $x_2$ in block 5 is a functional connection and not a simple conductor.

The input variables being, in conformity with what has been described hereinabove, delivered to block 3 in the form of currents and to block 5 in the form of voltages, the practical circuits will comprise either a current/voltage conversion or a voltage/current conversion.

In referring again to FIG. 1, it is seen that module 5 includes a transconductor referenced 13, two multipliers referenced respectively 7 and 9 and an adder circuit referenced 11.

The transconductor 13 receives as input the voltage representative of the coefficient $A_o$ and deliveres at its output to the addition circuit 11 a current the intensity of which is also representative of this same coefficient. Multiplier 7 receives as input the voltage representative of coefficient $A_2$ and the voltage representative of the input variable $x_2$, and deliveres by way of its output to the adder circuit 11 a current representative of the product $x_2A_2$. In an identical manner, multiplier 9 deliveres to adder circuit 11 a current representative of the product $x_1A_1$. Finally, the adder circuit 11 deliveres as output a current which is the sum of the currents which it receives as input, that is to say, a current the intensity of which is representative of the value of the expression:

$$A_o + A_1 x_1 + A_2 x_2$$

The quantities which the module 5 adds in order to deliver the value of the first-order polynomial function being, in the present example, the intensities of electric currents, the addition circuit can be formed, in effect, by a simple circuit node.

Figure 2:
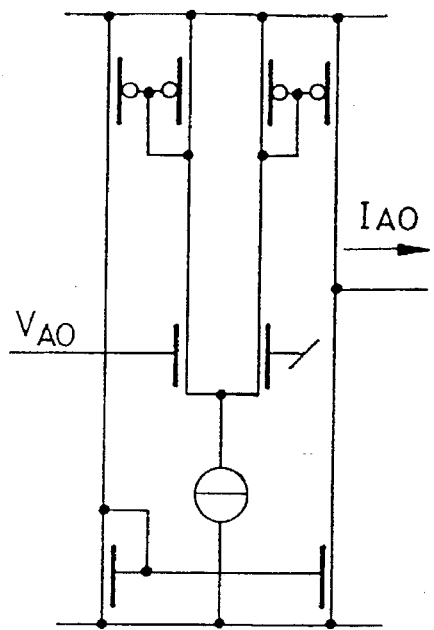
FIG. 2 is the electronic schematic of an embodiment of the transconductor designated by reference 13 on FIG. 1.

FIG. 2 is the electronic schematic of a transconductor (shown by a box referenced 13 on FIG. 1) the function of which is to deliver as output a current $I_{A_o}$ the intensity of which is proportional to the voltage $V_{A_o}$ which it receives as input. The design of this integrated circuit element is known and the schematic of FIG. 2 will thus not be further described.

Figure 3:
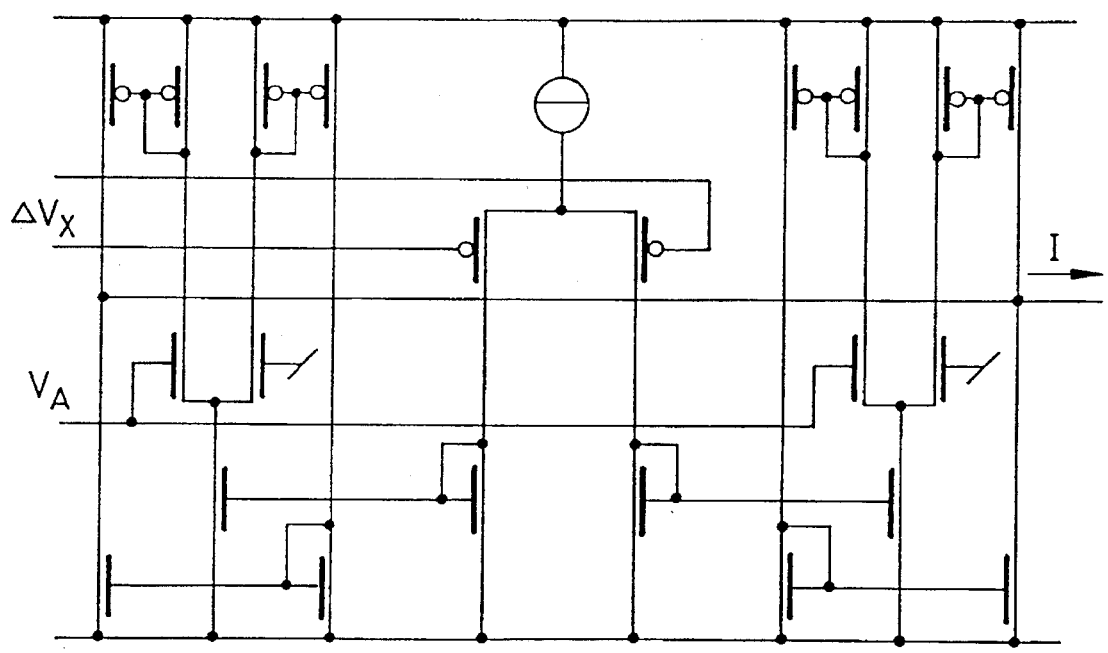
FIG. 3 is the electronic schematic of an embodiment of the multipliers designated by the references 7 and 9 on FIG. 1.

FIG. 3 is a schematic of a practical example of the multipliers referenced 7 and 9 on FIG. 1. The integrated circuit element shown on FIG. 3 receives thus as input, on the one hand, a differential voltage $\Delta V_x$ corresponding to the value of one of the input variables ($x_2$ for the multiplier 7 and $x_1$ for the multiplier 9) and, on the other hand, a voltage $V_A$ corresponding to the corresponding coefficient value. The function of this circuit element is to deliver as output a current I the intensity of which is proportional to the product of the two signals X and A received as input. The type of multiplier shown on FIG. 3 is known as a Gilbert multiplier and is well known to persons skilled in the art. It will thus not be further described.

Finally we may specify that the present invention is not limited to controllers applying algorithms which implement a center of gravity calculation, but can also be used with controllers applying other "defuzzification" algorithms.

What is claimed is:

1. An analog fuzzy logic controller implementing a set of fuzzy rules with which are respectively associated output values expressed as many polynomials, the coefficients of said polynomials having predetermined values specific to the different rules, and each of said rules including at least one condition consisting of a fuzzy relationship between one of said input variables and a reference value, said controller comprising first means for determining the weight of each of the fuzzy rules, said weight being determined by combining results of comparison of the values of the input variables with the reference values in the different conditions of said rule; wherein said controller further comprises:

second means for estimating a global value for each of said coefficients, said global value being determined by starting from the different values of said coefficient in the different rules and taking into account said respective weights of said rules, and third means for delivering, as output of said controller, the value of a polynomial in said set of input variables, the coefficients of said polynomial being said global values delivered by said second means.

2. An analog fuzzy logic controller as in claim 1, wherein the output values of said set of rules are expressed as polynomials of degree 1.

3. An analog fuzzy logic controller as in claim 1, wherein said second means determine the global value of each coefficient by a center of gravity calculation.

* * * * *